United States Patent Office 2,980,696
Patented Apr. 18, 1961

2,980,696
PHTHALEIN AND FLUORESCEIN DERIVATIVES

Jiří Körbl, 1327 Zdenka Nejedleho, Lysa nad Labem, Czechoslovakia

No Drawing. Filed Oct. 10, 1957, Ser. No. 689,254

Claims priority, application Czechoslovakia Oct. 16, 1956

7 Claims. (Cl. 260—327)

The present invention relates to a new method of producing phthalein and fluorescein derivatives and more particularly to a method which can be utilized for the production of derivatives which could not be produced by any known method.

It is a primary object of the present invention to provide a simple method of producing phthalein and fluorescein derivatives and particularly to a method of producing such derivatives including derivatives which could not be produced by any known method.

In accordance with the present invention phthalein derivatives having the following general formula:

(I)

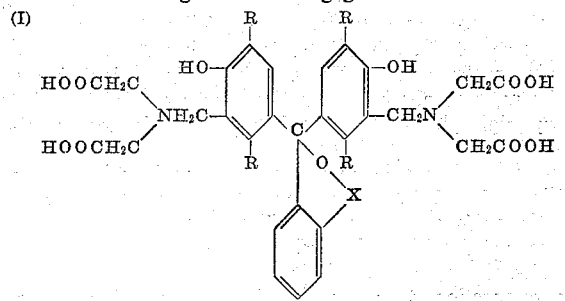

can be produced as well as fluorescein derivatives having the following general formula:

(II)

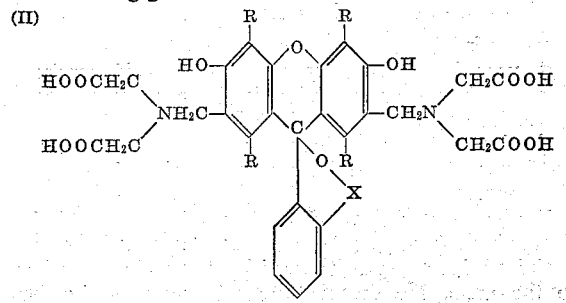

In these formulas the substituent R may be hydrogen, an alkyl radical such as methyl, ethyl, isopropyl or the like, or a halogen atom such as chlorine or bromine. The substituent X is CO or $SO_2$. The above formulas represent the probable structure of the compounds in solid or non-ionized state. It is to be understood that wherever Formulas I and II are set forth herein they are also meant to include the structures I' and II', respectively, as set forth below which are the probable structures in aqueous solution or ionized state, and vice versa:

(I')

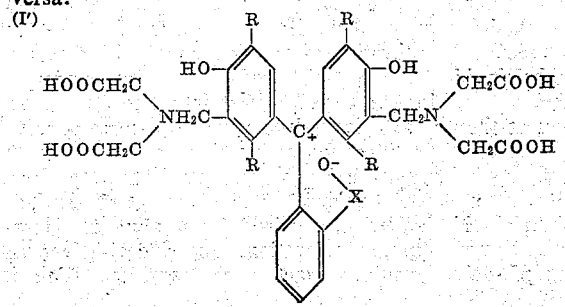

(II')

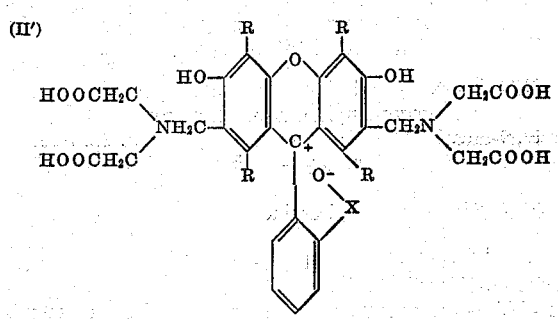

The class of compounds produced in accordance with the present invention include bis-N,N-dicarboxymethyl-aminomethyl derivatives of phenolphthalein-, o-cresolphthalein, m-cresolphthalein, thymolphthalein, fluorescein, phenolsulfonphthalein, dichlorophenolphthalein, dibromophenolphthalein, xylenolphthalein, dichlorophenolsulfonphthalein, dibromophenolsulfonphthalein, thymolsulfonphthalein, xylenolsulfonphthalein and the like. In the description which follows these compounds will, for purposes of brevity, simply be designed as "bis-derivatives."

The compounds of the present invention are all valuable acido-basic indicators showing concentration changes of some cations by their color change in aqueous solutions. The compounds of the present invention are suitable for this purpose both in alkaline and in acid solutions.

Attempts to produce bis-derivatives of the type produced herein by alkaline condensation of cresolphthalein, phenolphthalein and fluorescein with imino diacetic acid and formaldehyde result in the production of compounds which are contaminated with undesired by-products which are injurious for analytical purposes. These by-products consist of:

(1) unreacted phthalein dyestuff used as starting material;

(2) N,N-dicarboxymethyl-aminomethyl monoderivates, briefly "mono-derivatives;"

(3) ballast condensation products of the starting phthalein dyestuff with formaldehyde alone, i.e. higher molecular compounds in which many molecules of the starting phthalein dyestuff are cross-linked by methylene bridges; and (4) different dicarboxymethyl-aminomethyl derivatives of the condensation products mentioned in (3) above.

These by-products cannot be easily removed by known methods since their solubility closely approaches that of the desired final products. Some of them are even less soluble than the desired products so that they are concentrated therein by precipitation with acids during the isolation process.

The known alkaline condensation cannot be used generally; if e.g. xylenolsulfonphthalein or thymolsulfonphthalein are used as starting material, the reaction products consist almost entirely of the ballast by-products. Moreover, the sulfonphthalein derivatives cannot be purified by known methods at all.

It is a further object of the present invention to provide a method of condensing phthaleins and fluoresceins with imino diacetic acid and formaldehyde while avoiding all of the above set forth difficulties of carrying out such condensations in alkaline medium. In accordance with the present invention the condensation is carried out in acid medium in the presence of monovalent cations such as alkali metal or ammonium cations in a concentration which is sufficient to make the phthalein or fluorescein and/or the imino diacetic acid at least partially soluble in the medium which remains strongly acid.

The method of the present invention can result in the production of new bis-derivatives which cannot be produced by alkaline condensation at all but which can be easily prepared by the method of the present invention. Among the new compounds that may be prepared by the acid condensation method of the present invention are bis-N,N-dicarboxymethyl-aminomethyl phenolphthalein,
bis-N,N-dicarboxymethyl-aminomethyl xylenolphthalein,
bis-N,N-dicarboxylmethyl-aminomethyl thymolphthalein,
bis - N,N - dicarboxymethyl - aminomethyl phenolsulfonphthalein,
bis-N,N-dicarboxymethyl-aminomethyl dichlorophenolsulfonphthalein,
bis - N,N - dicarboxymethyl - aminomethyl dibromophenolsulfonphthalein,
bis - N,N - dicarboxymethyl - aminomethyl o - cresolsulfonphthalein,
bis - N,N-dicarboxymethyl - aminomethyl m - cresolsulfonphthalein,
bis - N,N - dicarboxymethyl - aminomethyl xylenolsulfonphthalein, and
bis - N,N - dicarboxymethyl - aminomethyl thymolsulfonphthalein.

In accordance with the method of the present invention the phthalein derivative of the following general formula:

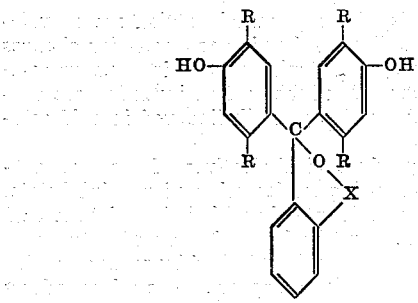

or the fluorescein derivative of the following general formula:

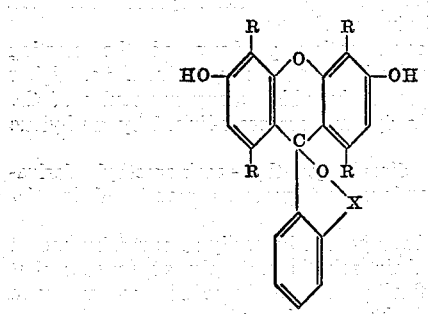

wherein R and X have the above set forth definitions, is heated with formaldehyde and imino diacetic acid in an acid medium, preferably a lower aliphatic carboxylic acid solution, such as acetic acid, in the presence of monovalent cations such as alkali metal or ammonium cations, which are necessary to bring at least one or both of the acidic reaction components, i.e. the imino diacetic acid or the phthalein or fluorescein derivative, at least partially into the solution. The resulting bis-derivative may then be easily isolated, for example by concentration of the reaction mixture, e.g. by evaporation, and precipitation of the derivative by means of a polar organic solvent, particularly a lower aliphatic alcohol such as ethanol. If necessary the recovery process may be repeated by renewed dissolution of the precipitate in water and further precipitation by means of a polar organic solvent.

The required cations may be added e.g. in the form of alkali metal or ammonium salts of lower aliphatic carboxylic acids, for instance of the ones used as solvents or reaction components, or also of any other appropriate acid. It is thus possible to use corresponding salts of imino diacetic acid instead of the free acid itself. It has been found, that it is possible to add such an amount of said cations, that the strongest acid groups present are neutralized, e.g. the —$SO_3H$ groups or one of the carboxylic groups of the imino diacetic acid component, the strongly acid reaction of the medium being maintained. Even if the amount of the added cations is such, that the used components are only partially soluble the equilibrium is rapidly renewed, the condensation runs to its end in a short period of time, and the reaction products are practically free of the undesired higher molecular by-products. The isolation is thus easy and the yields are unusually high.

The isolation method, mentioned above, consisting in precipitating the product with a low polar solvent such as with ethanol, is possible only in connection with the acid condensation according to the present invention. Salts of the desired bis-derivatives are thereby precipitated first of all, having 2-3 acid groups in their molecule neutralized with alkali metal or ammonium cations. Salts of mono-derivatives, however, formed but in a small amount, together with salts of the unreacted starting compounds, are substantially more soluble and remain in the mother liquor. The desired bis-derivative salts may be obtained in entirely pure condition and in very high yields by a further recrystallization of the precipitate from aqueous lower aliphatic alcohols with an appropriate pH-value, obtained for instance by addition of sodium acetate or of its mixture with free acetic acid; such a recrystallization causes almost no losses of the bis-derivatives.

The above described isolation method cannot be used in connection with the alkaline condensation, during which salts with all neutralized acid groups are formed. Such salts do not sufficiently differ in their solubility from the salts of the by-products and unreacted starting compounds.

A very important advantage of the acid condensation of the present invention is the absence of higher molecular condensation products of the starting phthalein derivatives with formaldehyde, which, on the contrary, are formed in considerable amounts during alkaline condensation.

Further research work showed that the pure bis-derivatives, obtainable easily by the present process, are most useful as indicators with distinct color change related to the metal ions concentration changes. Only these bis-derivatives form symmetric resonance structures with high color intensity and maximal shade depth. The presence of even small amounts of the unreacted starting phthalein dyestuff or of its mono-substituted derivative causes troubles in that the expected hue appears prematurely or, in the case of the fluorescein derivatives, a residual fluorescence is observed during the pH-changes of the solution. Similar troubles are caused by the higher molecular condensation products of the kind mentioned above. The color transitions are then unduly long and inexact, so that the reaction with metal ions cannot be exactly established. Thus, for instance, in complexometric titration of alkaline earths with o-cresolphthalein bis-derivative, obtained by alkaline condensation, a transition from deep violet into clear violet occurs at the point of equivalence; with the corresponding product of the acid condensation obtained according to the present invention a sharp transition from deep violet into colorless is achieved. Similarly, with sulfonphthalein bis-derivative, obtained by alkaline condensation, the premature red coloration, appearing with decreasing pH-value, troubles exact color transition. This is not so, however, with the same indicator prepared by acid condensation according to the invention.

Simultaneously all mentioned impurities unfavorably influence the shade of the coloration.

Flourescein bis-derivative prepared according to the present process possesses substantially different analytical properties in comparison with the preparation obtained from the same starting material by alkaline condensation. The latter is an indicator reacting on metal ions concentration changes by a color transition from brown into green. The acid-condensed derivative, however, is a metal-fluorescent one, probably due to its extreme purity. This circumstance opens entirely new possibilities of its use.

A great advantage of the indicators prepared by the new method is the perfect constance of their analytical properties. Similar derivatives known hitherto contain different amounts of impurities and their properties thus vary from one batch to another.

Among new substances, which could be obtained only by the method forming the object of the invention, there are some possessing new and useful, unexpected properties. Thus, for example, the thymolphthalein bis-derivative yields blue coloration with ions of Mn, Mg, Ca, Sr and Ba; in complexometric titration the solutions of said ions are decolored. The indication extent is thereat shifted to higher pH values, in comparison with o-cresolphthalein and phenolphthalein bis-derivatives, and this circumstance is particularly important for complexometric evaluation of strontium and barium.

Bis-derivatives of phenolsulfonphthalein, dichloro- and dibromophenolsulfonphthalein, o-, and m-cresolsulfonphthalein display characteristic color reactions in acid medium with ions of Zr, Bi, Th, Sc, La, and other rare earth elements; Fe, Al, Zn, Pb, Cu, Ni, Co, Hg, Cd, Mn and others. Thymolsulfonphthalein and xylenolsulfonphthalein show, in addition to said reactions in acid medium, also characteristic color reactions in alkaline medium, for instance, with ions of Zn, Pb, Vd, Cu, Ni, Co, Mn, Mg, Ca, Sr and Ba; this is made possible by unexpected, favorably changed course of acido-basic coloration properties of these bis-derivatives in comparison with the starting compounds, viz. thymolsulfonphthalein and xylenolsulfonphthalein. Both these new bis-derivatives may be used, if prepared by the present method, as universal metallochrome indicators.

The following examples will more fully illustrate the method of the present invention. It is to be understood that the scope of the invention is not meant to be limited to the specific details of the examples.

Example 1

66 parts of finely comminuted fluorescein, 53 parts of imino diacetic acid, 80 parts of sodium acetate (trihydrate) and 40 parts of 37% aqueous formaldehyde solution are mixed with 500 parts of glacial acetic acid. The mixture is heated in a closed vessel while shaking at 50–70° C. until all components are completely dissolved, which usually requires 2–8 hours. Thereafter about half of the volume is distilled-off and the residue is cooled down and precipitated by adding 1000–2000 ml. of ethanol. The precipitate is sucked-off, washed with ethanol and ether and air-dried. The yield is at least 120 parts, i.e. 81.5% of the theoretical amount, of the raw sodium salt of bis-N,N-dicarboxymethyl-aminomethyl-fluorescein. The raw sodium salt is dissolved in 360 parts of water, whereafter 120 parts of saturated sodium acetate solution and 4800 parts of ethanol are added. After having been left standing for two hours the clear liquid is decanted and the residue is mixed with a surplus of ethanol. After 1–3 days' standing the crystalline salt is sucked-off, washed with ethanol and dried. Instead of sodium acetate and imino diacetic acid it is possible to use the corresponding amount of sodium imino diacetate together with free imino diacetic acid. The product possesses the following structure:

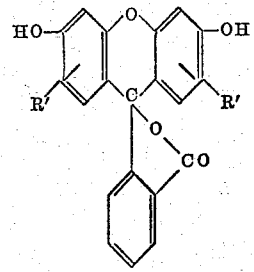

wherein R' signifies the group

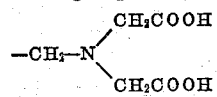

The fluorescein bis-derivative thus obtained is an orange-red crystalline substance, which decomposes when heated. The substance is soluble already in 2–3 parts of water. Very dilute solutions show intensive yellow-green fluorescence the fluorescence disappears in alkaline solution of at least 0.025 normal NaOH. In such a solution the fluorescence appears again when traces of some metal salts, e.g. those of calcium are added, and disappears again with addition of a suitable chelatation agent converting free metal ions into complexes.

Analogous bis-derivatives were prepared when using phenolphthalein, o-cresolphthalein, xylenolphthalein or thymolphthalein as starting materials, in yields between 70 and 95% of the theoretical amount.

Using the following compounds (set forth in the left-hand column) as starting materials, the condensation products possess the illustrated structures:

Phenolphthalein

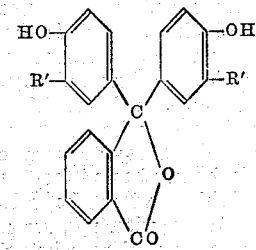

o-Cresolphthalein

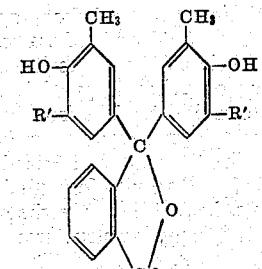

Xylenolphthalein

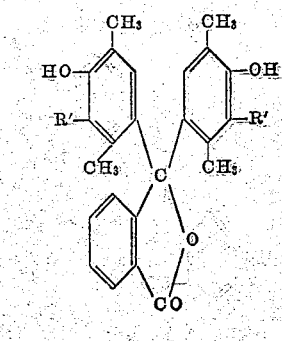

Thymolphthalein

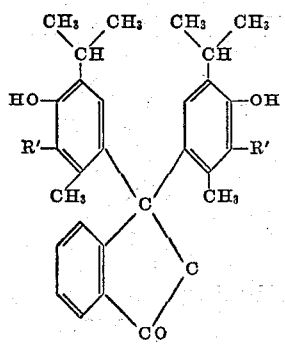

The compounds produced in accordance with the present invention from phenolphthalein, xylenolphthalein and thymolphthalein cannot be produced by alkali condensation methods.

The products of the acid condensation are white or slightly colored crystalline substances, easily soluble in water:

One part of the substance dissolves in 2-3 parts of water. Their diluted aqueous solutions react at suitable pH-values, usually above 7, with many cations yielding intensive coloration, which nearly agrees with that of the alkaline form of the starting dyestuff. The top limit of the indication pH extent rises in the series of phenolphthalein, xylenolphthalein and thymolphthalein bis-derivatives.

Example 2

8 parts of sodium imino diacetate are heated with 50 parts of glacial acetic acid until a clear or milk-like turbid solution is obtained, which is then cooled down to the room temperature. Thereafter 9.3 parts of thymolsulfonphthalein are dissolved therein and finally 4 parts of a 37% aqueous formaldehyde solution are added. The closed vessel with the reaction mixture is left standing until the next day at room temperature and then the mixture is further heated for 8 hours at 50° C. The reaction is finished when the solution, prepared from one drop of the reaction mixture and 50–100 ml. of distilled water, does not change its yellow color into red after addition of 5 ml. of normal nitric acid, and when another solution, prepared from one drop of the reaction mixture and 50–100 ml. of water, acidified with 1 ml. of normal nitric acid, changes it yellow color into blue after addition of a few drops of 0.05 normal solution of thorium tetranitrate. The isolation and purification is carried out in the same way as in Example 1. The yield of tetrasodium salt of 3.3-bis-N,N-dicarboxymethylaminomethyl thymolsulfonphthalein amounts usually to 14 parts, i.e., 83% of the theoretical amount. The product has the following structure:

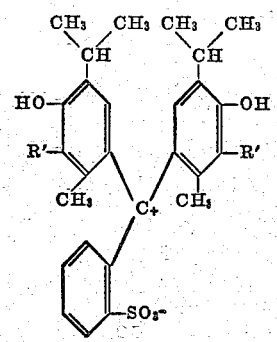

It is a black, fine-crystalline substance, dissolving in 2–3 parts of water to an ink-blue solution changing its color into yellow when strongly diluted. Diluted, strongly acid solutions with pH less than zero are intensively red. Solutions with pH between zero and 6.5 have pure yellow color; at pH 6.5–8.5 they turn into clear blue, between pH 10.5–11.5 into greyish yellow and above 12.7 into deep blue. The indicator forms with many cations between pH 0–12.7 intensively blue colored chelates (complex compounds).

Analogous bis-derivatives were prepared from phenolsulfonphthalein, o- and m-cresolsulfonphthalein, xylenolsulfonphthalein and the like, using the method described above. The obtained condensation products are dark red till black crystalline, easily water-soluble substances. Some of them, e.g. the xylenolsulfonphthalein, are in their behaviour very similar to the thymolsulfonphthalein bis-derivative. Other derivatives, such as o- or m-cresolsulfonphthalein or phenolsulfonphthalein derivatives react with cations also both in acid and alkaline medium; characteristic color changes are produced, however, particularly in acid medium. Dichloro- or dibromophenolsulfonphthalein may be also used as starting compounds; in this case it is more advantageous to carry out the condensation at higher temperatures, i.e. at about 70° C. The test reactions, indicating the accomplishment of the process, should be fitted to known color changes of the starting sulfonphthaleins.

When the following compounds are used as starting material, then the products of the acid condensation have the structure illustrated below:

o-Cresolsulfonphthalein

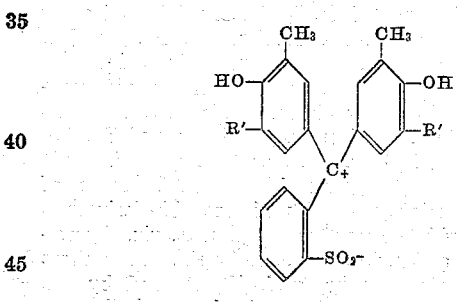

m-Cresolsulfonphthalein

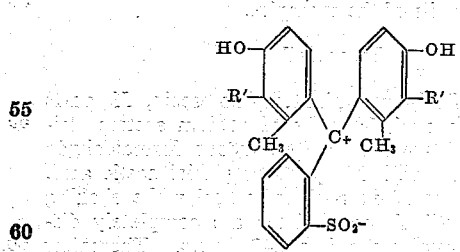

Phenolsulfonphthalein

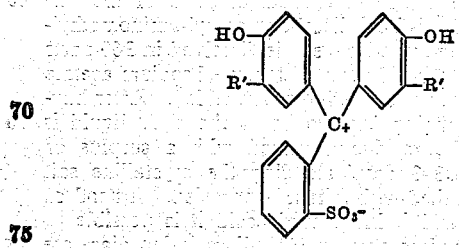

Xylenolsulfonphthalein

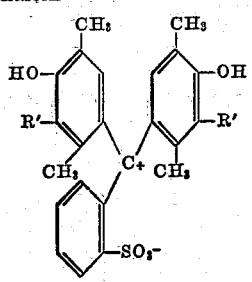

Dichlorophenolsulfonphthalein

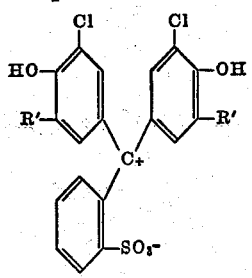

The dibromophenolsulfonphthalein bis-derivative possesses an analogous structure to the dichloro compound shown above the only difference being the substitution of Br in the formula for the Cl.

Among the new derivatives which have been prepared as set forth above are the bis-derivatives of phenolsulfonphthalein, dichlorophenolsulfonphthalein, dibromophenolsulfonphthalein, o-cresolsulfonphthalein, m-cresolsulfonphthalein, xylenolsulfonphthalein and thymolsulfonphthalein.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method of producing a compound selected from the group consisting of:

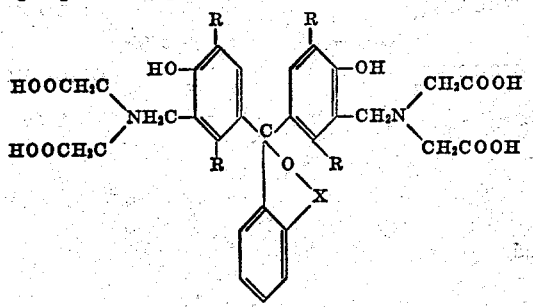

and

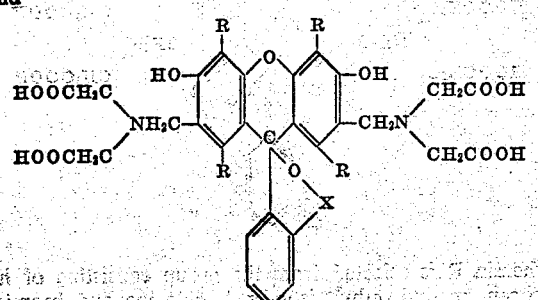

wherein R is selected from the group consisting of hydrogen, and methyl, ethyl, isopropyl, chlorine and bromine atoms, and X is selected from the group consisting of CO and $SO_2$, comprising the steps of heating a substance seelcted from the group consisting of:

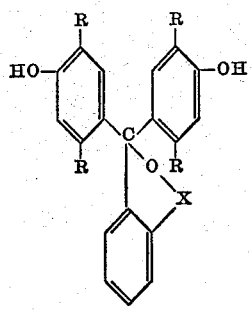

and

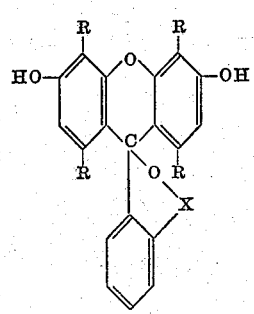

wherein R and X have the same definitions as above as insoluble reactant with imino diacetic acid as insoluble reactant and with formaldehyde at a temperature of 50–70° C. in a medium of a lower aliphatic monocarboxylic acid in the presence of a salt of one of said acids and a monovalent cation, said monovalent cation being selected from the group consisting of alkali metal and ammonium cations and being present in an amount sufficient to dissolve at least one of said insoluble reactants, thereby forming the corresponding compound; and recovering the thus formed compound.

2. A method of producing a compound selected from the group consisting of:

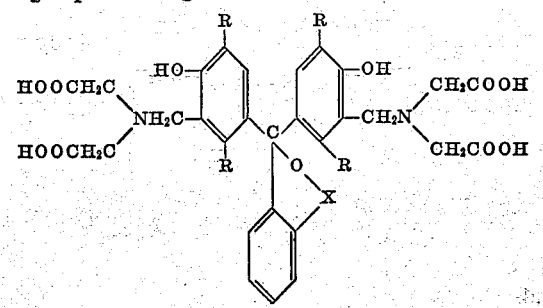

and

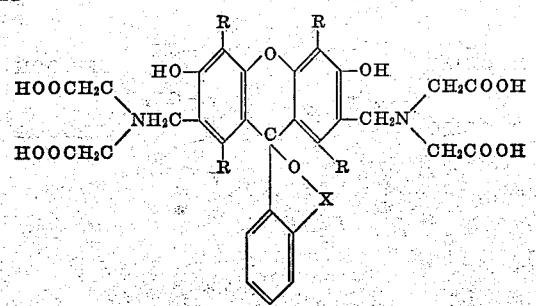

wherein R is selected from the group consisting of hydrogen, methyl, ethyl, isopropyl, chlorine and bromine atoms, and X is selected from the group consisting of CO and $SO_3$, comprising the steps of heating a substance selected from the group consisting of:

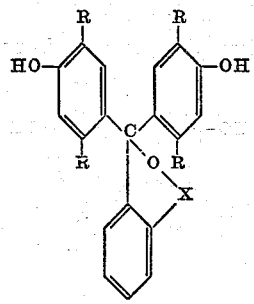

and

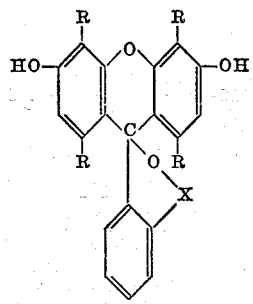

wherein R and X have the same definitions as above as insoluble reactant with imino diacetic acid as insoluble reactant and with formaldehyde at a temperature of 50–70° C. in a medium of a lower aliphatic monocarboxylic acid in the presence of a salt of one of said acids and an alkali metal cation, said alkali metal cation being present in an amount sufficient to dissolve at least one of said insoluble reactants, thereby forming the corresponding compound; and recovering the thus formed compound.

3. A method of producing a compound selected from the group of consisting of:

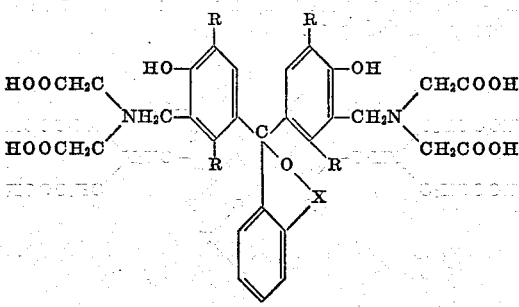

and

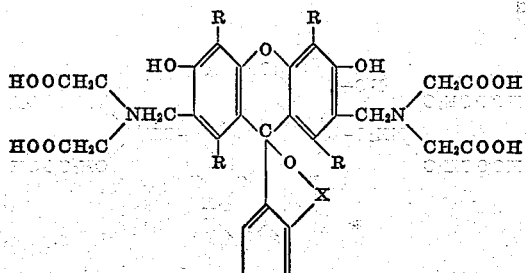

wherein R is selected from the group consisting of hydrogen, methyl, ethyl, isopropyl, chlorine and bromine atoms, and X is selected from the group consisting of CO and $SO_2$, comprising the steps of heating a substance selected from the group consisting of:

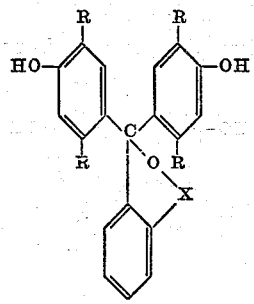

and

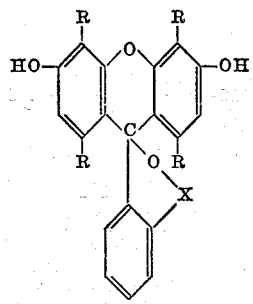

wherein R and X have the same definitions as above as insoluble reactant with imino diacetic acid as insoluble reactant and with formaldehyde in a medium of a lower aliphatic monocarboxylic acid at a temperature of 50–70° C. in the presence of a salt of one of said acids and a monovalent cation, said monovalent cation being selected from the group consisting of alkali metal and ammonium cations and being present in an amount sufficient to dissolve at least one of said insoluble reactants, thereby forming the corresponding compound; concentrating the thus formed reaction mixture; and precipitating said compound by means of a lower aliphatic alcohol as polar organic solvent.

4. A method of producing a compound selected from the group consisting of:

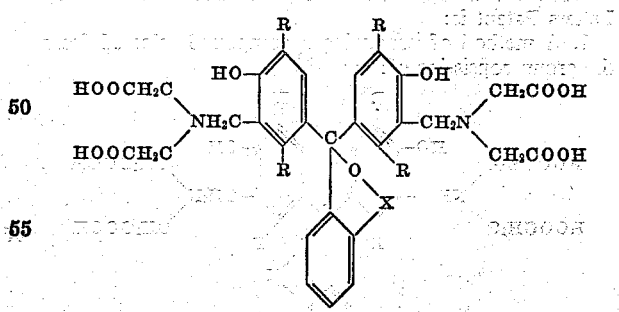

and

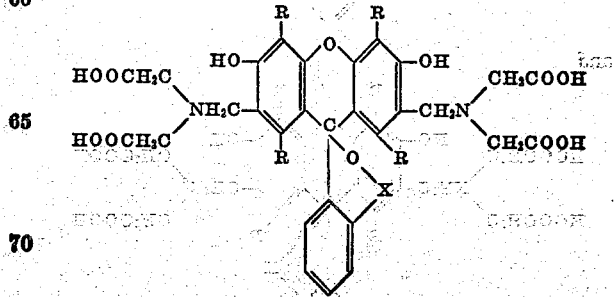

wherein R is selected from the group consisting of hydrogen, methyl, ethyl, isopropyl, chlorine and bromine atoms, and X is selected from the group consisting of CO and SO$_2$, comprising the steps of heating a substance selected from the group consisting of:

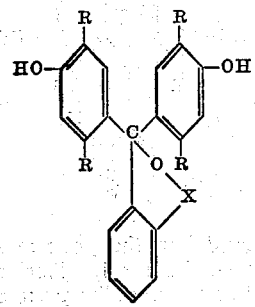

and

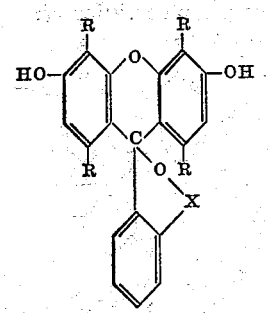

wherein R and X have the same definitions as above as insoluble reactant with imino diacetic acid as insoluble reactant and with formaldehyde in a medium of a lower aliphatic monocarboxylic acid at a temperature of 50–70° C. in the presence of a salt of one of said acids and an alkali metal cation, said alkali metal cation being present in an amount sufficient to dissolve at least one of said insoluble reactants, thereby forming the corresponding compound; concentrating the thus formed reaction mixture; and precipitating said compound by means of a lower aliphatic alcohol.

5. A method of producing a compound selected from the group consisting of:

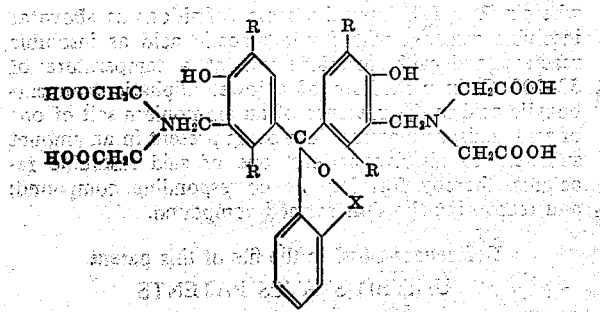

and

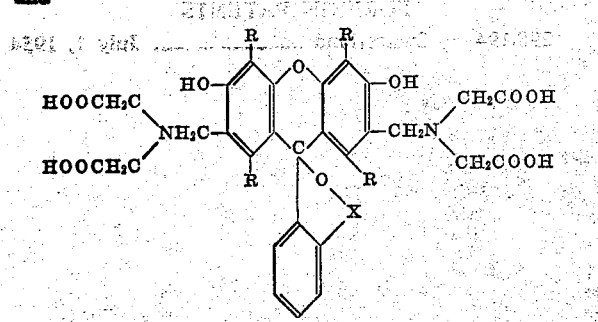

wherein R is selected from the group consisting of hydrogen, methyl, ethyl, isopropyl, chlorine and bromine atoms, and X is selected from the group consisting of CO and SO$_2$, comprising the steps of heating a substance selected from the group consisting of:

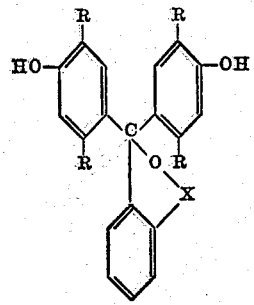

and

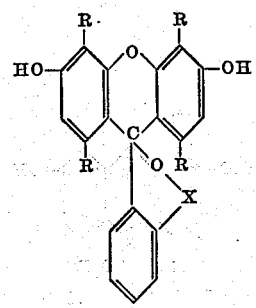

wherein R and X have the same definitions as above as insoluble reactant with imino diacetic acid as insoluble reactant and with formaldehyde at a temperature of 50–70° C. in a medium of a lower aliphatic monocarboxylic acid in the presence of a sodium salt of one of said acids, said sodium being present in an amount sufficient to dissolve at least one of said insoluble reactants, thereby forming the corresponding compound; concentrating the thus formed reaction mixture; and precipitating said compound by means of ethyl alcohol.

6. A method of producing a compound selected from the group consisting of:

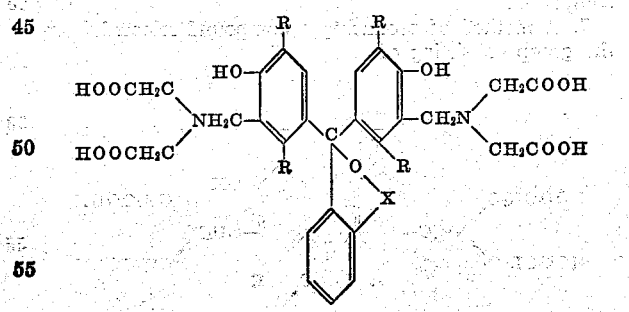

and

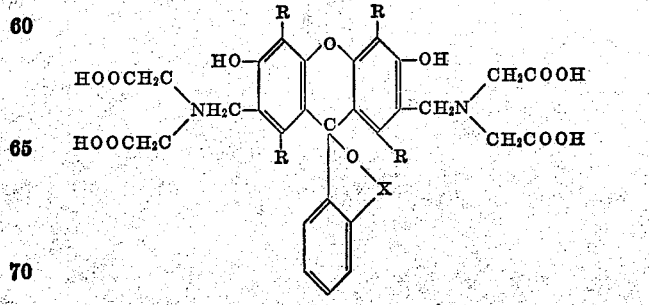

wherein R is selected from the group consisting of hydrogen, methyl, ethyl, isopropyl, chlorine, and bromine atoms, and X is selected from the group consisting of CO and $SO_2$, comprising the steps of heating a substance selected from the group consisting of:

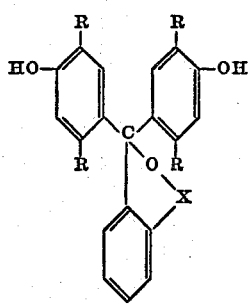

and

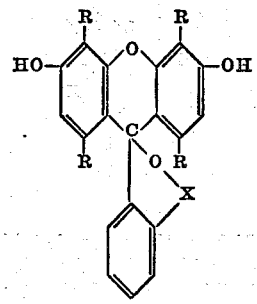

wherein R and X have the same definitions as above as insoluble reactant with imino diacetic acid as insoluble reactant and with formaldehyde at a temperature of 50—70° C. in a medium of acetic acid in the presence of sodium acetate in an amount sufficient to dissolve at least one of said insoluble reactants, thereby forming the corresponding compound; and recovering the thus formed compound.

7. A method of producing a compound selected from the group consisting of:

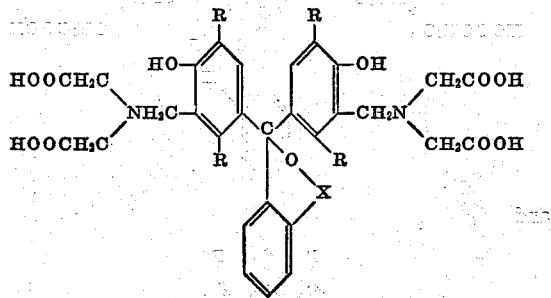

and

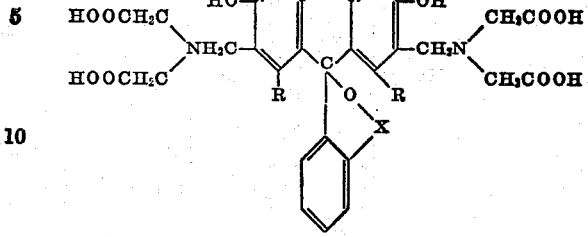

wherein R is selected from the group consisting of hydrogen, methyl, ethyl, isopropyl, chlorine and bromine atoms, and X is selected from the group consisting of CO and $SO_2$, comprising the steps of heating a substance selected from the group consisting of:

and wherein R and X have the same definitions as above as insoluble reactant with imino diacetic acid as insoluble reactant and with formaldehyde at a temperature of 50–70° C. in a medium of a lower aliphatic monocarboxylic acid in the presence of an ammonium salt of one of said acids, said ammonium being present in an amount sufficient to dissolve at least one of said insoluble reactants, thereby forming the corresponding compound; and recovering the thus formed compound.

References Cited in the file of this patent
UNITED STATES PATENTS
2,745,720  Schwarzenbach _____ May 15, 1956
FOREIGN PATENTS
298,194  Switzerland _____ July 1, 1954